Figure 1:
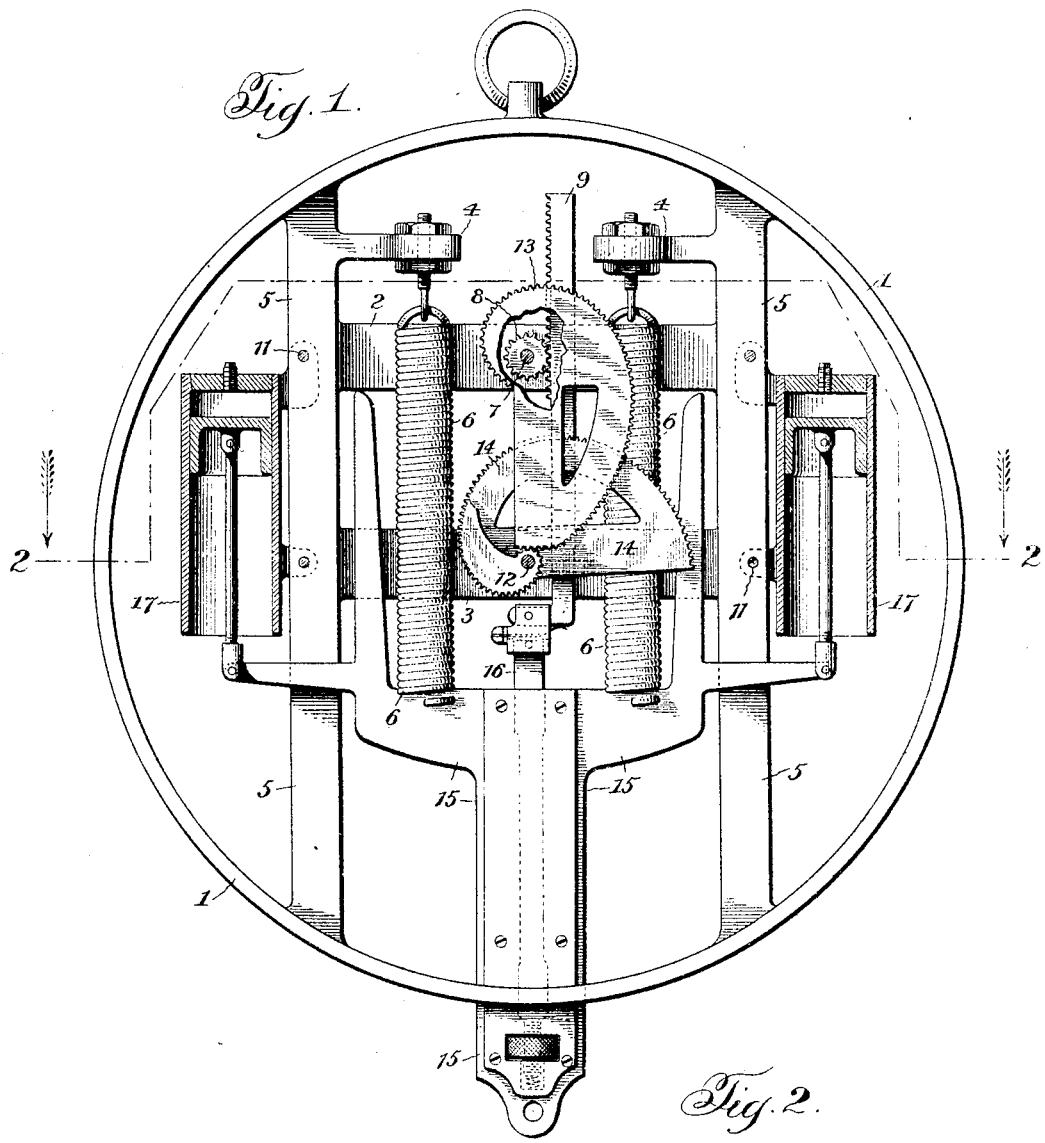

No. 806,499. PATENTED DEC. 5, 1905.
G. P. RITTER.
COMPUTING WEIGHING MACHINE.
APPLICATION FILED APR. 26, 1905.

4 SHEETS—SHEET 1.

Witnesses
Jas. E. Hutchinson
Wm. E. Dyre

Inventor
Gilbert P. Ritter
by F. W. Ritter Jr.
Attorney

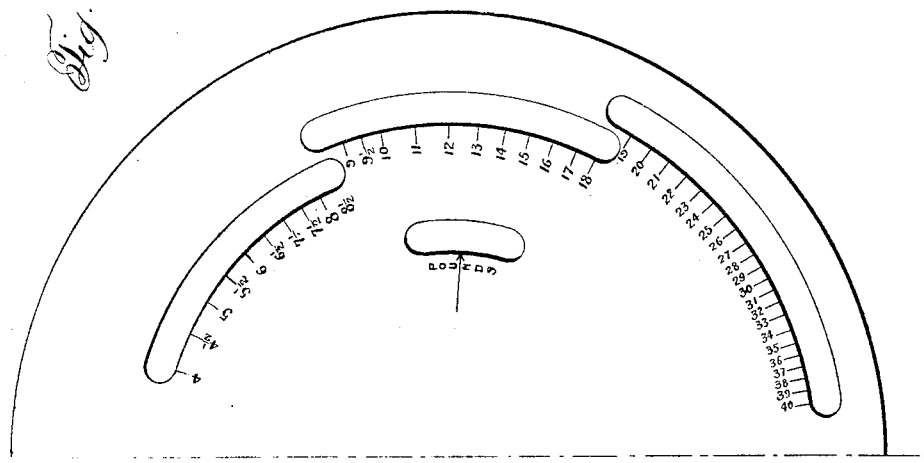
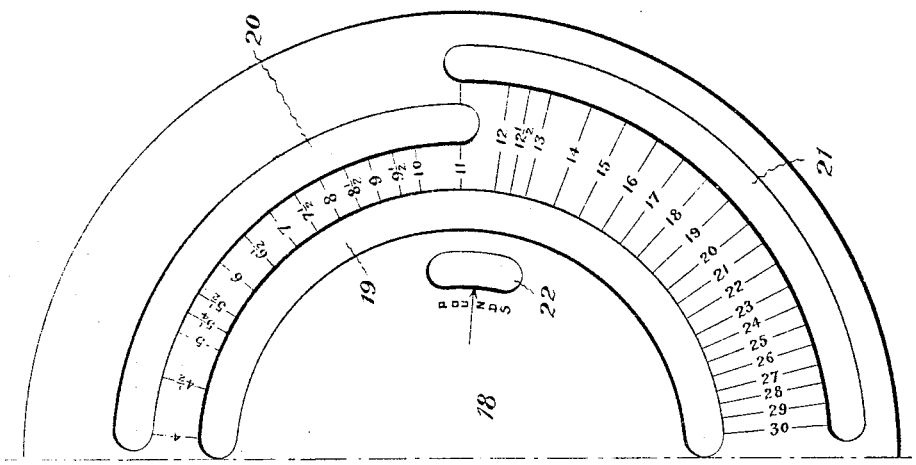

No. 806,499. PATENTED DEC. 5, 1905.
G. P. RITTER.
COMPUTING WEIGHING MACHINE.
APPLICATION FILED APR. 26, 1905.

4 SHEETS—SHEET 3.

Witnesses
Jas. E. Hutchinson.
Wm. E. Dyre.

Inventor
Gilbert P. Ritter
by F. W. Ritter, Jr.
Attorney

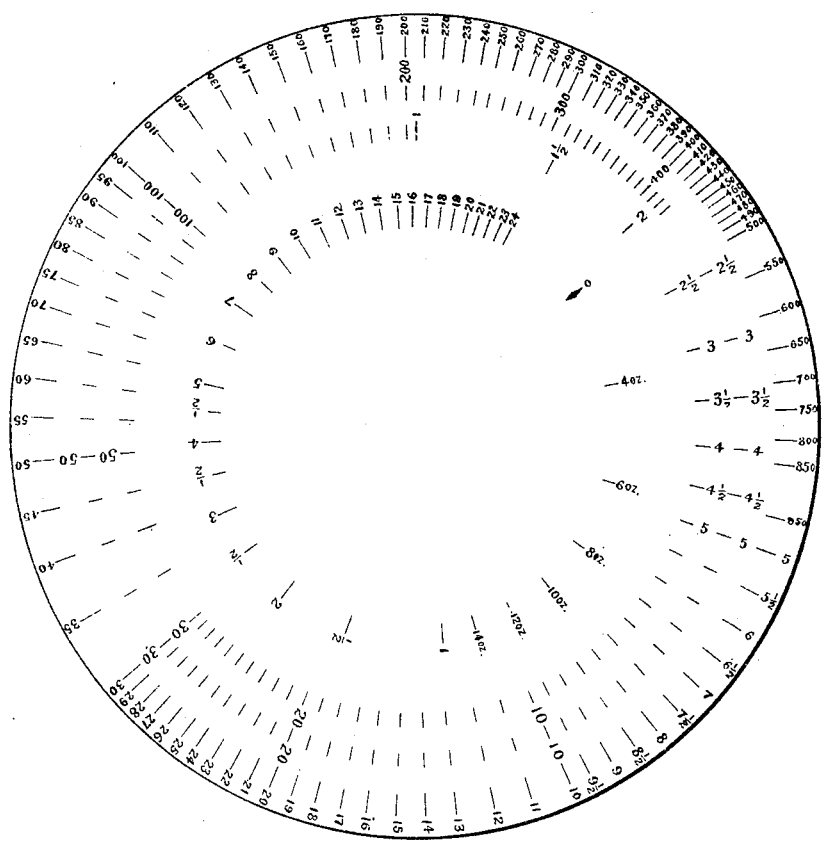

UNITED STATES PATENT OFFICE.

GILBERT P. RITTER, OF CHICAGO, ILLINOIS.

COMPUTING WEIGHING-MACHINE.

No. 806,499.  Specification of Letters Patent.  Patented Dec. 5, 1905.

Application filed April 26, 1905. Serial No. 257,498.

*To all whom it may concern:*

Be it known that I, GILBERT P. RITTER, a citizen of the United States, residing at Chicago, in the county of Cook and State of Illinois, have invented certain new and useful Improvements in Computing Weighing-Machines; and I do hereby declare the following to be a full, clear, and exact description of the invention, such as will enable others skilled in the art to which it appertains to make and use the same.

My invention relates to the construction of mechanically-operated calculating devices, and is particularly applicable to weighing-machines of the so-called "computing" type, as will appear from the specific embodiment thereof shown in the drawings forming a part of this specification.

Hitherto in the construction of weighing-scales in which the value of the quantity weighed is indicated opposite price marks or graduations it has been necessary to provide the cylinder or dial bearing the value-marks with a plurality of value-scales corresponding in number to the number of prices for which the scale is intended to compute values. It follows from such an arrangement that many repetitions and reduplications are necessary in the value-scales, thus increasing the complexity thereof, with the result that when such value-scales are applied to a cylinder the length of the cylinder is greatly increased and when applied to a flat circular dial the figures or graduations near the center are crowded to such an extent as to generally render necessary the omission of certain value-graduations corresponding to weights which at points nearer the circumference of the dial have value graduations or computations therefor at other prices. Among other disadvantages incident to weighing-machines of this type as now commonly constructed is the fact that, owing to the character of the value-scales and the manner in which the value-figures are placed thereon, values corresponding to weights intermediate of those for which values are computed cannot be estimated with any tolerable degree of accuracy, the result being that errors of several cents frequently occur at the higher prices.

To overcome these and other objections in a simple and efficient manner is the object of the present invention.

To this end my invention, generally stated, may be said to reside in a combination wherein the price and value scales each constitute a series in which the indicia representing units are spaced at variable distances apart, said price and value scales being relatively movable through means operative by the counterbalancing operation to cause the proper value-indicia to register with respective price-indicia.

There are other features of invention residing in particular construction and elemental combinations, all as will hereinafter appear and be particularly pointed out in the claims.

Figure 2:
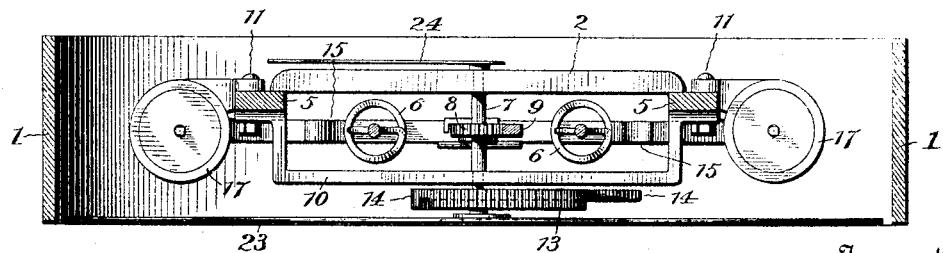
Figure 8:
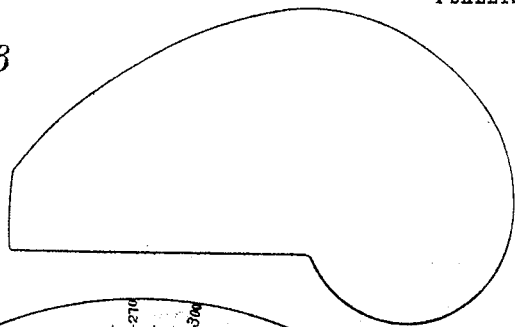
Figure 5:
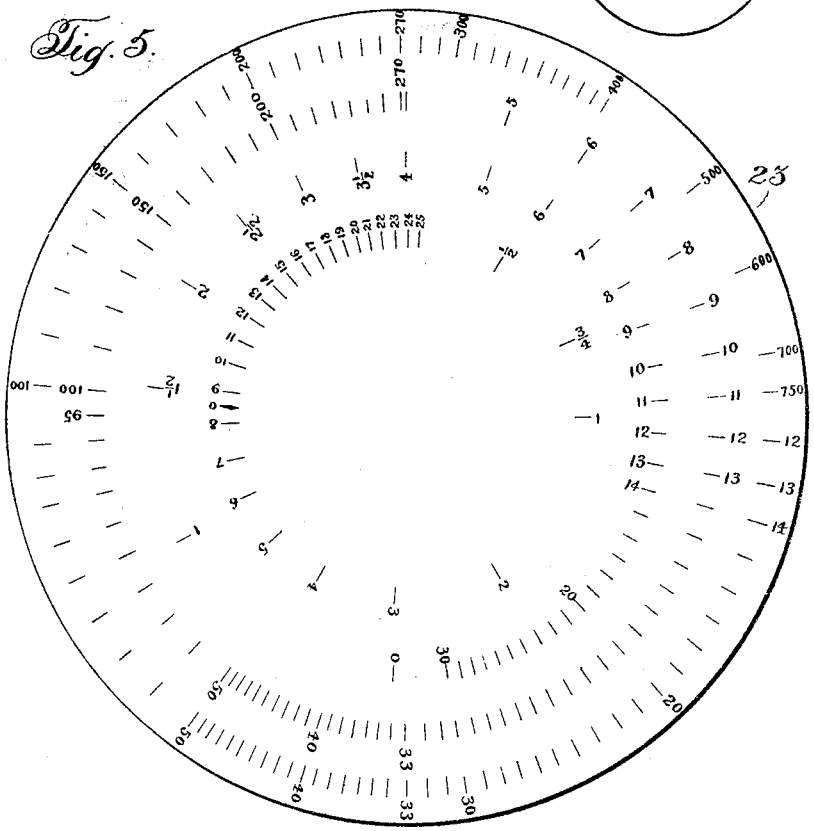
Figure 7:
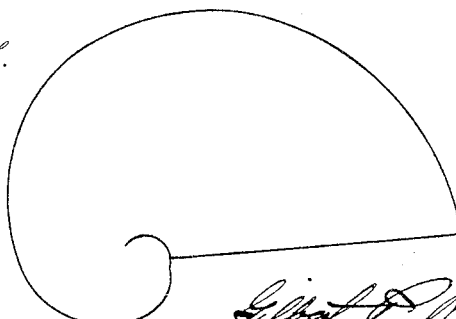

In the drawings chosen for the purpose of illustrating my invention, the scope whereof is pointed out in the claims, Figure 1 is a front elevation of a weighing-machine embodying my invention, the price-dial and the value-dial removed. Fig. 2 is a horizontal section of the same, taken on the line 2 2, Fig. 1. Fig. 3 is a view of the graduated portion of the price-dial designed for use with the mechanism illustrated in Figs. 1 and 2. Fig. 4 is a view of the graduated portion of a modified arrangement of the price-dial. Fig. 5 is a view of the value-dial for use with the price-dial illustrated in Fig. 3. Fig. 6 is a view of a value-dial for use with the price-dial illustrated in Fig. 4. Figs. 7 and 8 are enlarged views of the pitch-lines of the variable-motion gears shown in Figs. 1 and 2.

Like symbols refer to like parts wherever they occur.

I will now proceed to describe my invention more fully, so that others skilled in the art to which it appertains may apply the same.

Since the invention as defined by the claims is general in its application, the construction chosen to illustrate the same will be described without regard to the specific form and arrangement of such parts of the mechanism as are well known.

In the drawings, 1 is a scale-case having horizontal bars 2 and 3 and spring-suspending brackets 4, all formed integral with the vertical bars 5 of the said case. To the brackets 4 the springs 6 may be attached in any suitable manner, as by means of the screw-eyes and nuts, as shown, which permit adjustment of the springs.

The horizontal transverse shaft 7, to which is affixed the circular pinion 8, which meshes with the vertically-moving rack-bar 9, is journaled in the transverse bar 2 of the spring-case and in the corresponding bar of a hollow rectangular frame 10, which is secured to the vertical bars 5 by bolts 11.

The horizontal transverse shaft 12 is located centrally of the spring-case 1 and is journaled in the horizontal bar 3 of the spring-case and in the corresponding bar of the said hollow rectangular frame 10. The logarithmically-graduated value-dial 23 is affixed to the outer end of the shaft 12 and turns relatively to the price-dial 18, which is suitably secured to the scale-case in a parallel and concentric position.

To the outer end of the shaft 7 is secured a variable-curvature gear-wheel 13, which meshes with a second variable-curvature gear-wheel 14, secured to the outer end of the centrally-located shaft 12. These variable-curvature gear-wheels 13 and 14 are of such form that while the upper one 13 moves through equal angles corresponding to equal increments of weight the centrally-located one 14 moves through variable distances equal to the logarithms of the numbers representing such weights. The pitch-lines for laying out these gears for any arrangement of the price and value scales may be obtained by plotting the numerical values resulting from substitution in the following general equations: Let $r$ equal radiant of any point on the rolling curve or pitch-line of the gear-wheel, which moves through equal angles for equal increments of weight. $r_1$ equals radiant of any corresponding or mating point on the rolling curve or pitch-line of the gear-wheel which moves with a variable angular displacement equal to the logarithm of the angular displacement of the other gear-wheel. $c$ equals distance between the centers of the two variable-curvature gear-wheels. $\Phi$ equals any angle, measured from an initial position, turned through by the gear-wheel which moves through equal angles for equal increments of weight. $\Phi_1$ equals the angle, measured from an initial position, turned through by the gear-wheel which moves with a variable angular displacement. Since the distance between centers of the variable-curvature gears must remain constant, for any two mating radiants, $$r + r_1 = c \quad (1)$$

Since the pitch-lines or rolling curves always touch at the point of contact, they must have a common tangent at that point, and consequently the tangents of the angles made by each of said curves with the line joining the centers of the variable-curvature gears must be equal, $$\frac{r \, d\Phi}{dr} = \frac{r_1 \, d\Phi_1}{dr_1} \quad (2)$$

Since one gear-wheel revolving through a definite angle $\Phi$ causes the other gear-wheel to revolve through an angle $\Phi_1$, which is the logarithm of the angle $\Phi$, $$\Phi_1 = \log_{10} \Phi \quad (3)$$

or $$\Phi_1 = \frac{1}{2.302} \log \varepsilon \, \Phi$$

or $$d\Phi_1 = \frac{1}{2.302} \frac{d\Phi}{\Phi}$$

Since the elements of arc between mating radiants on each of the pitch lines or curves are equal, $$dr^2 + r^2 \, d\Phi^2 = dr_1^2 + r_1^2 \, d\Phi_1^2 \quad (4)$$

By an algebraic combination of the equations above given, $$r = \frac{c}{2.302 \, \Phi + 1} \quad (5)$$

By substituting values, as 1, 2, 3, &c., for $\Phi$ the values of $r$ at points corresponding to one pound, two pounds, three pounds, &c., may be obtained. A simple method of laying out these pitch-lines is to first draw two equal circles dividing the circumference of one into equal increments of arc corresponding to the distances through which it is desired the driving gear-wheel to turn in one pound and dividing the circumference of the other into distances equal to the logarithms of the corresponding divisions on the first circle. Draw the radii to the respective division-points on each of the circles, thus dividing the two into angles corresponding, respectively, to the numbers 1, 2, 3, &c., and to the logarithms of said numbers. The values of the mating radiants being computed by substitution in the equations, as before described, may be now immediately plotted on the radii of the two circles and the pitch-lines determined. In the special case chosen in the drawings to illustrate the manner of constructing the variable-curvature gears when it is desired that the value-bearing dial shall make more than one complete revolution the said gears are constructed to pass each other by forming them with overlapping portions each of which mesh with an alined portion of the mating gear nearer its center, as will be readily understood upon reference to Figs. 1 and 2.

Enlarged views of the pitch-lines of the variable-curvature gears are shown in Figs. 7 and 8, and in each it will be noted that there are corresponding circular portions designed to coöperate through small initial distances traversed by both the gears—say from zero to one-quarter of a pound—such a construction decreasing the initial distance through which the logarithmically-movable gear turns without sensible error in results.

The frame 15, which is attached to the lower ends of the springs 6 and which carries the adjustable tare-bar 16 and attached rack-bar 9, may be provided with laterally-extending arms engaging the plungers of dash-pots 17, the latter being of any well-known or suitable construction.

While I have illustrated two arrangements of the price-scales and value-scales, it is to be understood that these are only typical cases chosen for the purpose of illustrating certain features of invention and that the value-figures constituting the logarithmic series may be arranged to form a single scale or a plurality of scales, as desired, the pitch-lines for the variable-curvature gears for any arrangement of scales being readily obtainable by numerical substitution in the general equations hereinbefore given.

The nature of logarithmic series and scales is well known, and the variable distances at which the indicia representing units in such series are spaced apart are readily obtainable from a table of logarithms, so that it is unnecessary to state the properties of logarithms or the manner of graduating the price and value scales further than to describe the relative arrangement of the logarithmic scales shown in the case illustrated.

In Fig. 3 is shown the graduated portion of a circular dial or cover 18, having price-indicia thereon arranged in a logarithmic series, said price-indicia bordering concentric circular arc-shaped apertures, such as 19, 20, and 21, through which the value-indicia upon the value-bearing dial coöperating therewith are disclosed. The said price dial or cover 18 may also be provided with an additional arc-shaped aperture 22, through which the weights are disclosed.

In Fig. 5 is shown the dial 23, which bears value-indicia logarithmically spaced to correspond with the price-indicia carried by the dial 18, the indicia forming the value-scales being arranged in a plurality of concentric circles relatively positioned to be disclosed through the apertures 19, 20, and 21 in the price-dial. The said value-dial 23 may be also provided with a series of circularly-arranged numbers which are adapted to be seen through the aperture 22 in the dial 18 to indicate the weight.

In the arrangement shown in Figs. 3 and 5 it is intended that for all weights under one pound the values shall be read through the aperture 19 opposite the respective prices, the values for all weights over one pound being read in a similar manner through the outer apertures 20 and 21. This arrangement illustrates one means of causing the machine to be very sensitive for weights under one pound.

In Fig. 4 is shown an arrangement of the price-indicia upon the price dial or cover such that the values for all weights are always read through the same apertures, the corresponding concentric circular arrangement of the logarithmically-graduated value-scales being indicated in Fig. 6.

On the value-dials shown in Figs. 5 and 6 it is to be understood that some only of the graduations appear; but the graduations may be made continuous at such intervals as may be desired.

If desired, the inner end of the shaft 7 may have a hand or indicator 24 attached thereto for the purpose of indicating the weight in a well-known manner, the device being thus arranged to disclose both weights and values upon one side and weights merely upon the other.

The several parts of the device having been assembled as indicated, the device may be adjusted by placing a known weight upon the scale-pan and adjusting the tare-bar and price-dial until the value-dial turns through the proper distance for the given weight, as shown by the indicia upon said value-dial. The counterbalancing operation will cause the value-dial 23 to revolve logarithmically, so that the logarithm of the weight is mechanically added to the logarithm of the price, and hence the values of the given weight at the several prices are brought into apposition with such price-indicia.

Having thus described my invention, what I claim, and desire to secure by Letters Patent, is—

1. In a weighing-machine, the combination with weighing mechanism, of a movable member having circularly-arranged indicia thereon, a fixed member having circularly-arranged indicia thereon, and means operative by the counterbalancing operation for moving said members relatively, whereby the indicia on one member are caused to simultaneously register with separate indicia upon the other member.

2. In a weighing-machine, the combination with weighing mechanism, of a member having circularly-arranged value-indicia, a member having circularly-arranged price-indicia, and means operative by the counterbalancing operation for moving said members relatively, whereby the indicia on one member are caused to simultaneously register with separate indicia upon the other member.

3. In a weighing-machine, the combination with weighing mechanism, of a member having value-indicia arranged in concentric circular arcs, a member having price-indicia arranged in concentric circular arcs, and means operative by the counterbalancing operation for moving said members relatively, whereby the indicia on one member are caused to simultaneously register with separate indicia upon the other member.

4. In a weighing-machine, the combination with weighing mechanism, of a dial having thereon value-indicia constituting a series in which the units are spaced at variable distances apart, a member having thereon price-indicia constituting a series in which the units are spaced at variable distances apart, and means operative by the counterbalancing operation for moving said members relatively.

5. In a weighing-machine, the combination with weighing mechanism, of a member having thereon value-indicia constituting a series in which the units are spaced at variable distances apart, a member having thereon price-indicia constituting a series in which the units are spaced at variable distances apart, and means operative by the counterbalancing operation for moving said members relatively.

6. In a weighing-machine, the combination with weighing mechanism, of a member having thereon value-indicia constituting a series in which the units are spaced at variable distances apart, a member having price-indicia thereon, and means operative by the counterbalancing operation for moving said members relatively.

7. In a weighing-machine, the combination with weighing mechanism, of a member having thereon value-indicia, a member having thereon price-indicia constituting a series in which the units are spaced at variable distances apart, and means operative by the counterbalancing operation for moving said members relatively.

8. In a weighing-machine, the combination with weighing mechanism, of a member having value-indicia thereon arranged in a series, a member having price-indicia thereon arranged in a parallel series, and means operative by the counterbalancing operation for moving said members relatively, whereby the indicia on one member are caused to simultaneously register with separate indicia upon the other member.

9. In a weighing-machine, the combination with weighing mechanism, of a member having value-indicia forming a curve, a member having price-indicia forming a parallel curve, and means operative by the counterbalancing operation for moving said members relatively, whereby the indicia on one member are caused to simultaneously register with separate indicia upon the other member.

10. In a weighing-machine, the combination with weighing mechanism, of a member having value-indicia forming a curve, a member having price-indicia forming a curve, and means operative by the counterbalancing operation for moving said members relatively, whereby the indicia on one member are caused to simultaneously register with separate indicia upon the other member.

11. In a weighing-machine, the combination with weighing mechanism, of a member having value-indicia forming a curve in which the units are spaced at variable distances apart, a member having price-indicia thereon, and means operative by the counterbalancing operation for moving said members relatively.

12. In a weighing-machine, the combination with weighing mechanism, of a member having price-indicia forming a curve in which the units are spaced at variable distances apart, a member having value-indicia thereon, and means operative by the counterbalancing operation for moving said members relatively.

13. In a weighing-machine, the combination with weighing mechanism, of a member having value-indicia, a member having price-indicia, and means operative by the counterbalancing operation for moving said members relatively whereby an identical part of the value-indicia is caused to register with distinct price-indicia.

14. In a weighing-machine, the combination with weighing mechanism, of a member having value-indicia arranged in a plurality of series, a member having price-indicia, and means operative by the counterbalancing operation for moving said members relatively whereby an identical part of the price-indicia may be caused to register with distinct value-indicia of different series.

15. In a weighing-machine, the combination with weighing mechanism, of suitable price-indicating means, suitable value-indicating means, and means operative by the counterbalancing operation for relatively moving said price-indicating means and said value-indicating means through unequal distances corresponding to equal increments of weight.

16. In a weighing-machine, the combination with weighing mechanism, of suitable logarithmic indicating means, actuating devices operative by the counterbalancing operation comprising means movable with a displacement directly proportional to the weight, and means movable with a displacement which varies with the weight but is not directly proportional thereto.

17. In a weighing-machine, the combination with weighing mechanism, of suitable price-indicating means, suitable value-indicating means, and means operative by the counterbalancing operation for relatively moving said price-indicating means and said value-indicating means logarithmically.

18. In a weighing-machine, the combination with weighing mechanism, of suitable indicating means, and actuating devices operative by the counterbalancing operation comprising a plurality of movable members one of which is movable with a displacement proportional to the logarithm of the displacement of the other.

19. In a weighing-machine, the combination with weighing mechanism, of suitable indicating means, and actuating devices operative by the counterbalancing operation comprising a plurality of shafts one of which is movable with a displacement equal to the logarithm of the displacement of the other.

20. In a weighing-machine, the combination with weighing mechanism, of a member bearing price-indicia thereon constituting a series in which the units are spaced at variable distances apart, a member bearing value-indicia thereon constituting a series in which the units are spaced at variable distances apart, and means operative by the counterbalancing operation for relatively moving said members to cause the price-indicia to register with value-indicia corresponding to the value of the quantity weighed.

21. In a weighing-machine, the combination with weighing mechanism, of a member bearing price-indicia thereon relatively positioned to form a logarithmic series, a member having value-indicia thereon relatively positioned to form a logarithmic series, and means operative by the counterbalancing operation for relatively moving said members to cause the price-indicia to register with value-indicia corresponding to the value of the quantity weighed.

22. In a weighing-machine, the combination with weighing mechanism, of a member bearing logarithmically-arranged price-indicia thereon, a member bearing logarithmically-arranged value-indicia thereon, and means operative by the counterbalancing operation for relatively moving said members so that the price-indicia shall register with value-indicia corresponding to the sum of the logarithm of the price and the logarithm of the quantity weighed.

23. In a weighing-machine, the combination with weighing mechanism, of a plurality of relatively movable members, one of said members having value-indicia thereon and one of said members having price-indicia arranged in a circular arc bordering an arc-shaped aperture, and means operative by the counterbalancing operation for moving said members relatively.

24. In a weighing-machine, the combination with weighing mechanism, of a plurality of relatively movable members, one of said members having value-indicia thereon and one of said members having price-indicia arranged thereon in a plurality of circular arcs, and means operative by the counterbalancing operation for moving said members relatively.

25. In a weighing-machine, the combination with weighing mechanism, of a plurality of relatively movable members, one of said members having value-indicia thereon and one of said members having price-indicia arranged thereon in a plurality of circular arcs bordering a plurality of corresponding apertures, and means operative by the counterbalancing operation for moving said members relatively.

26. In a weighing-machine, the combination with weighing mechanism, of a plurality of relatively movable dials one of which has price-indicia thereon relatively positioned to form a logarithmic series and one of which has value-indicia thereon relatively positioned to form a logarithmic series, and means operative by the counterbalancing operation for moving said dials relatively with a displacement which varies as the logarithm of the quantity weighed.

27. In a weighing-machine, the combination with weighing mechanism, of a plurality of members having logarithmically-arranged indicia thereon, and means operative by the counterbalancing operation for causing the indicia upon one member to register with indicia upon the other member corresponding respectively to the sum of the logarithm of each of the adjacent indicia upon the first-named member and the logarithm of the quantity weighed.

28. In a weighing-machine, the combination with weighing mechanism, of a plurality of relatively movable gears the pitch-lines of which are of variable curvature, and means operative by the counterbalancing operation for actuating said gears so that the displacement of one is proportional to the logarithm of the displacement of the other.

29. In a weighing-machine, the combination with weighing mechanism, of a plurality of relatively movable overlapping gears the pitch-lines of which are of variable curvature, and means operative by the counterbalancing operation for actuating said gears so that the displacement of one is proportional to the logarithm of the displacement of the other.

30. In a weighing-machine, the combination with suitable weighing mechanism, of a driving and a driven gear the sum of the radiants of which at mating points of their respective pitch-lines is constant and in which the radiant at any point on the pitch-line of one of the gears is equal to the distance between centers of the gears divided by one plus the product of a constant and the angle included between an initial radiant and the radiant to any point of the pitch-line, and means operative by the counterbalancing operation for actuating said driving-gear.

31. In a weighing-machine, the combination with suitable weighing mechanism, of a driving and a driven gear the pitch-lines of which are of variable curvature, said gears overlapping each other and one of said gears being movable with a displacement corresponding to the logarithm of the quantity weighed, and means operative by the counterbalancing operation for actuating said driving-gear.

32. In a weighing-machine, the combination with weighing mechanism, of a member having logarithmically-arranged indicia thereon, a member having a variably-curved perimeter, and means operative by the counterbalancing operation for actuating said first-named member through said variably-curved member.

In testimony whereof I affix my signature in presence of two subscribing witnesses.

GILBERT P. RITTER.

Witnesses:
WM. E. DYRE,
HUGH M. STERLING.